United States Patent
Landon et al.

(10) Patent No.: US 8,153,261 B2
(45) Date of Patent: *Apr. 10, 2012

(54) SOLID POLYMERIC SUBSTRATE HAVING ADHERENT RESIN COMPONENT DERIVED FROM CURABLE SILYLATED POLYURETHANE COMPOSITION

(75) Inventors: Shayne J. Landon, Ballston Lake, NY (US); Misty Huang, New City, NY (US); Bruce A. Waldman, Cortland Manor, NY (US)

(73) Assignee: Momentive Performance Materials Inc., Albany, NY (US)

( * ) Notice: Subject to any disclaimer, the term of this patent is extended or adjusted under 35 U.S.C. 154(b) by 1472 days.

This patent is subject to a terminal disclaimer.

(21) Appl. No.: 11/515,442

(22) Filed: Sep. 1, 2006

(65) Prior Publication Data

US 2008/0057316 A1    Mar. 6, 2008

(51) Int. Cl.
    *B32B 27/40* (2006.01)
(52) U.S. Cl. ............... 428/423.1; 428/423.5; 428/424.2; 428/424.7
(58) Field of Classification Search ............... 428/423.1, 428/423.5, 424.2, 424.7
    See application file for complete search history.

(56) References Cited

U.S. PATENT DOCUMENTS

| | | |
|---|---|---|
| 3,729,444 A | 4/1973 | Bey |
| 4,345,053 A | 8/1982 | Rizk et al. |
| 4,459,382 A | 7/1984 | Ona et al. |
| 5,063,270 A | 11/1991 | Yukimoto et al. |
| 5,120,379 A | 6/1992 | Noda et al. |
| 5,223,597 A | 6/1993 | Iwakiri et al. |
| 5,519,104 A | 5/1996 | Lucas |
| 5,567,530 A | 10/1996 | Drujon et al. |
| 5,804,253 A | 9/1998 | Hagiwara et al. |
| 5,849,832 A | 12/1998 | Virnelson et al. |
| 5,990,257 A | 11/1999 | Johnston et al. |
| 6,008,305 A | 12/1999 | Wang et al. |
| 6,136,446 A | 10/2000 | Virnelson et al. |
| 6,136,910 A | 10/2000 | Virnelson et al. |
| 6,150,441 A | 11/2000 | Chiba et al. |
| 6,255,434 B1 | 7/2001 | McGraw et al. |
| 6,284,360 B1 | 9/2001 | Johnson et al. |
| 6,372,827 B2 | 4/2002 | Johnson et al. |
| 6,406,782 B2 | 6/2002 | Johnson et al. |
| 6,423,661 B1 | 7/2002 | McGraw et al. |
| 6,432,865 B1 | 8/2002 | McGraw et al. |
| 6,457,294 B1 | 10/2002 | Virnelson et al. |
| 6,784,272 B2 | 8/2004 | Mack et al. |
| 6,828,403 B2 | 12/2004 | Mahdi et al. |
| 6,833,423 B2 | 12/2004 | Roesler et al. |
| 7,524,915 B2 * | 4/2009 | Huang et al. .................... 528/28 |
| 7,541,076 B2 * | 6/2009 | Landon ............................ 428/34 |
| 7,569,645 B2 * | 8/2009 | Lin et al. ....................... 525/477 |
| 7,569,653 B2 * | 8/2009 | Landon .......................... 528/65 |
| 2002/0100550 A1 | 8/2002 | Mahdi et al. |
| 2002/0194813 A1 | 12/2002 | Virnelson et al. |
| 2003/0221770 A1 * | 12/2003 | Meixner et al. ............... 156/230 |
| 2004/0188016 A1 | 9/2004 | Mahdi et al. |
| 2004/0204539 A1 | 10/2004 | Schindler et al. |
| 2006/0194930 A1 | 8/2006 | Bachon et al. |
| 2007/0129528 A1 * | 6/2007 | Huang et al. .................... 528/78 |

FOREIGN PATENT DOCUMENTS

| | | |
|---|---|---|
| WO | WO 03/014194 | 2/2003 |
| WO | WO 2005/000931 | 1/2005 |
| WO | WO 2005/003201 | 1/2005 |

OTHER PUBLICATIONS

Shayne J. Landon et al., Adhesives Sealants & Industry "Hybrid Sealants Demonstrate Enhanced Adhesion to Plastic Substrates", Mar. 1997.

* cited by examiner

*Primary Examiner* — Thao T. Tran
(74) *Attorney, Agent, or Firm* — Dominick C. Vicari; Joseph S. Ostroff

(57) ABSTRACT

A solid polymeric substrate having a resin derived from curable silylated polyurethane composition exhibiting superior properties adhered thereto. The silylated polyurethane is prepared by reacting a polyol component with a diisocyanate component to form a hydroxyl-terminated prepolymer and endcapping the prepolymer with an isocyanate silane.

26 Claims, No Drawings

SOLID POLYMERIC SUBSTRATE HAVING ADHERENT RESIN COMPONENT DERIVED FROM CURABLE SILYLATED POLYURETHANE COMPOSITION

FIELD OF THE INVENTION

The present invention relates to solid polymeric substrates having a resin derived from curable silylated polyurethane composition adhered thereto. The silylated polyurethane is prepared by reacting a polyol component with a diisocyanate component to form a hydroxyl-terminated prepolymer, and endcapping the prepolymer with an isocyanatosilane.

BACKGROUND OF THE INVENTION

Urethane polymers have in the past been modified to modulate their functionality by endcapping some or all of the isocyanate groups with a variety of organosilanes to yield silane end-capped urethane polymers containing minimal or no isocyanate groups. Silane-endcapped urethane sealants frequently exhibit insufficient flexibility to be useful in applications requiring considerable extension and compression. To overcome these problems, U.S. Pat. No. 4,645,816 to Pohl and Osterholtz described a novel class of room-temperature, moisture-curable, silane-terminated polyurethanes bearing terminal isocyanate groups reacted with a silane monomer having one dialkoxysilyl group and an organo-functional group with at least one active hydrogen. The polymers were crosslinked to produce elastomeric networks with improved flexibility. Another approach to reducing the crosslinking density of the cured elastomers, is to use secondary aminosilanes with bulky substituents on the nitrogen as silane endcappers, preferably reacting all free isocyanate endgroups with these secondary amino silanes.

The use of difunctional silanes and/or sterically hindered silanes, typically employing amine reactivity for the endcapping of the urethane prepolymers, suffers from several drawbacks. The secondary amine containing silanes are slow to react with the urethane prepolymer while polymer endcapped with dialkoxysilyl functional silanes are typically very slow to cure. Particularly the formation of urea, which is experienced when using amino silanes, leads to a meaningful increase in viscosity of the prepolymer, potentially resulting in processing problems and application restrictions. A high viscosity silane terminated prepolymer would in particular hinder the formulation of a low viscosity coating composition. Organic solvents could be used to thin a coating formulation based on the aminosilane terminated prepolymer and would allow application of the material by spraying, dipping or brushing. However, polymers requiring greater amounts of solvents are less desirable because of volatile organic compound emissions, flammability or health perspectives as examples.

Employing trialkoxysilyl groups as endcappers for silylated precursors intended to have considerable flexibility requires forming extended polymer chains with a significantly high average molecular weight to balance out the crosslinking density inherent in the use of the trifunctional endcapper. This polymer structure has led to increased viscosity of the eventual product to unacceptably high levels particularly when amino silane endcappers are used to build urea bonds. The synthesis routes to build high molecular weight isocyanate-terminated polyurethanes using di- or polyisocyanates and conventional polyether polyols have exhibited the problem of low to negligible isocyanate residual functionality of the urethane prepolymer before silane endcapping. Hence, synthesis of these types of systems may be not feasible, and/or these systems may offer unacceptable cure profiles and mechanical properties.

Silyl-terminated polyurethanes (STPU) prepared by directly capping polyether polyols is well known in the art. However, sealants made from the direct capping of polyether polyols have poor adhesion to many organic and inorganic substrates. Thus, there remains a need for silylated polyurethane polymers that offer improved mechanical and adhesive properties.

SUMMARY OF THE INVENTION

A solid polymeric substrate having adhered to at least a portion of a surface thereof a resin obtained from the curing of a curable resin-forming composition which comprises:
a) hydroxyl-terminated polyurethane prepolymer derived from the reaction of a stoichiometric excess of polyether polyol with polyisocyanate;
b) isocyanatosilane; and, optionally,
c) at least one additional component selected from the group consisting of filler, UV stabilizer, antioxidant, catalyst, adhesion promoter, cure accelerator, thixotropic agent, plasticizer, moisture scavenger, pigment, dye, surfactant, defoamer, solvent and biocide.

The curable resin-forming composition joined to the polymeric substrate of the present invention can encompass coatings, adhesives and sealants having superior adhesion properties that can be applied on a variety of substrates as disclosed herein.

DETAILED DESCRIPTION OF THE INVENTION

The solid polymeric substrates of the present invention include natural polymers such as cellulosic, e.g., cellulosic materials such as paper, cotton, fiberboard, paperboard, wood, woven or nonwoven fabrics, and synthetic polymers such as, elastomers, and plastics, e.g., polycarbonates.

Additional solid polymeric substrates of the present invention include phenol resins, epoxy resins, polymethyl(meth)acrylate (PMMA), polyesters, polycarbonates (PC) polymers of ethylene, polystyrene, and ABS resins (acrylonitrile-butadiene-styrene resins), films of plastics such as acrylic resin, polyvinyl alcohol, polyvinyl chloride, polyethylene terephthalate (PET), polyurethanes including polyurethane foam as used for insulation of roofs, tanks and pipes, polyimides, acrylic polymer filled with aluminum trihydrate, e.g., Corian (a registered trademark of DuPont), polycarbonates, e.g., Lexan (a registered trademark of the General Electric Co.), polyetherimides, e.g., Ultem (a registered trademark of the General Electric Co.), modified polyphenyleneoxides, e.g., Noryl (a registered trademark of the General Electric Co.). Still other solid polymeric substrates of the present invention include synthetic and natural rubber, silicon, and silicone polymers.

The urethane polymers bearing terminal active hydrogen atoms that are useful in preparing the curable resin-forming composition of the present invention can be prepared by the reaction of an organic di- or polyisocyanate reactant component with a stoichiometric excess of a polyol reactant component, which can be a polyether polyol or comprises a combination of polyols. A catalyst is optional depending on the reactivity of the respective reactants. The reaction temperature is typically in the range of 60° to 90° C.; the reaction time is typically on the order of about 4 to 10 hours. Example preparations are set out in herein below.

In one embodiment of the present invention, the organic di- and polyisocyanates include aliphatic diisocyanate, cycloaliphatic diisocyanate, araliphatic diisocyanate and aromatic diisocyanate. In another embodiment of the present invention, the diisocyanate is selected from the group consisting of hexamethylene diisocyanate, para-phenylene diisocyanate, 4,4'-diphenylmethane diisocyanate, 2,4'-diphenylmethanediisocyanate, isophorone diisocyanate, 4,4'-dicyclohexylmethane diisocyanate, 1,4-cyclohexane diisocyanate, 1,3-bis-(isocyanatomethyl)cyclohexane, 2,4-toluene diisocyanate, 2,6-toluene diisocyanate, naphathalene-1,5-diisocyanate, tetramethylxylyene diisocyanate, and the like, and mixtures thereof.

For the production of the urethane prepolymers one or more diols and triols can be employed in the reaction such as polyether polyols, polyester polyols, polybutadienediols, polyoxyalkylene diols, polyoxyalkylene triols, polytetramethylene glycols, polycaprolactone diols and triols, and the like, having two or more hydroxyl groups. In one embodiment of the present invention, the polyols employed have a very low unsaturation level and therefore high functionality. Said polyols are typically prepared using metal complex catalysts for the polymerization of alkylene oxide resulting in polyols having a low level of terminal ethylenic unsaturation. In one embodiment of the present invention the polyols have a terminal ethylenic unsaturation that is specifically less than 0.2 milliequivalents per gram (meq/g) of polyol. In another embodiment of the invention, the terminal ethylenic unsaturation is less than 0.1 milliequivalents per gram (meq/g) of polyol, and in yet another embodiment the terminal ethylenic unsaturation is less than 0.02 milliequivalents per gram (meq/g) of polyol. The molecular weight of the polyols is specifically in the range between from about 500 and about 50,000 grams per mole (g/mol), and more specifically from about 2000 to about 20,000 grams per mole.

Some non-limiting examples of polyether, polyester or polymer polyols that can be used in the present invention include polyoxypropylene polyether polyol or mixed poly (oxyethylene/oxypropylene) polyether polyol. Some specific examples of polyether polyols are polyoxyalkylene polyol, particularly linear and branched poly (oxyethylene) glycol, poly (oxypropylene) glycol, copolymers of the same and combinations thereof. Graft or modified polyether polyols are those polyether polyols having at least one polymer of ethylenically unsaturated monomers dispersed therein. Non-limiting representative modified polyether polyols include polyoxypropylene polyether polyol into which is dispersed poly (styrene acrylonitrile) or polyurea, and poly (oxyethylene/oxypropylene) polyether polyols into which is dispersed poly (styrene acrylonitrile) or polyurea. Graft or modified polyether polyols comprise dispersed polymeric solids. Suitable polyesters of the present invention, include but are not limited to aromatic polyester polyols such as those made with phthalic anhydride (PA), dimethyl terephthalate (DMT), polyethylene terephthalate (PET) and aliphatic polyesters, and the like. Some commercially available polyether polyol that can be used in the present invention include ARCOL® polyol U-1000, Hyperlite E-848 from Bayer AG, Voranol Dow BASF, Stepanpol from Stepan, Terate from Invista.

In one embodiment of the present invention, the polyether diol of the present invention possesses a number average molecular weight of from about 2,000 to about 16,000 grams per mole. In another embodiment of the present invention, the polyether diol possesses a number average molecular weight of from about 8,000 to about 16,000 grams per mole.

To prepare active hydroxyl group-terminated polyurethanes useful in the preparation of the curable resin-forming composition of the present invention, at least a slight molar excess of the hydroxyl equivalents (—OH groups) with respect to the isocyanate equivalents (—NCO groups) is employed to terminate the polymer chains with hydroxyl groups. In one embodiment of the present invention, the hydroxyl to isocyanate equivalent ratio is from about 1.05 to about 3.3 and the hydroxyl-terminated polyurethane prepolymer contains at least one hydroxyl functional group. In another embodiment of the present invention the hydroxyl to isocyanate equivalent ratio is from about 1.2 to about 2 and the hydroxyl-terminated polyurethane prepolymer contains at least one hydroxyl group.

The initially formed polyurethane prepolymers as described herein above, are subsequently endcapped with an isocyanatosilane in a second step to form the desired silyl-terminated polyurethane (STPU) polymer. In one embodiment the isocyanatosilane endcappers suitable for endcapping of the active hydrogen terminal atoms bearing urethane prepolymers are represented by the general formula:

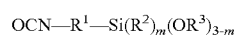

wherein $R^1$ is a divalent hydrocarbon group, $R^2$ is alkyl containing 1 to 4 carbon atoms, $R^3$ is alkyl containing 1 to 4 carbon atoms, and m is an integer from 0 to 2. The $R^1$ group can have any of a wide variety of structures forming a stable bridge between the terminal isocyanate group and the alkoxysilane group. In one embodiment of the present invention, $R^1$ is an arylene, or a straight, cyclic or branched hydrocarbon having from about 1 to about 12 carbon atoms. In another embodiment, $R^1$ is a lower alkylene group having 1 to 6 carbon atoms and at least 3 carbon atoms in another embodiment.

The urethane prepolymer having active hydrogen atoms is reacted in an approximately stoichiometric amount with the above described isocyanatosilane to form a stable prepolymer having one or more terminal alkoxysilane groups.

A number of structures for such isocyanato alkoxysilane compounds are illustrated for example, in columns 4 and 5 of U.S. Pat. No. 4,146,585, incorporated herein by reference. In one embodiment of the present invention, however, $R^1$ is a lower alkylene group having 1 to 3 carbon atoms and in another embodiment $R^1$ is about 3 carbon atoms therein.

Specific isocyanatosilanes that can be used herein to react with the foregoing hydroxyl group-terminated polyurethane prepolymers include isocyanatomethyldimethoxysilane, isocyanatomethyltrimethoxysilane, isocyanatopropyldimethylmethoxysilane, isocyanatopropyltrimethoxysilane, isocyanatoisopropyltrimethoxysilane, isocyanato-n-butyltrimethoxysilane, isocyanato-t-butyltrimethoxysilane, isocyanatopropyltriethoxysilane, isocyanatoisopropyltriethoxysilane, isocyanato-n-butyltriethoxysilane, isocyanato-t-butyltriethoxysilane, and the like.

In one embodiment of the present invention, the isocyanatosilane is gamma-isocyanatopropyltriethoxy silane, and in yet another embodiment of the present invention the isocyanatosilane is gamma-isocyanatopropyltrimethoxysilane.

The urethane prepolymer syntheses as well as the subsequent silylation reaction are specifically conducted under anhydrous conditions and more specifically under an inert atmosphere, such as a blanket of nitrogen, to prevent premature hydrolysis of the alkoxysilane groups. A typical temperature range for both reaction steps, is 20° C. to 150° C., and more preferably between 60° C. and 90° C. Typically, the total reaction time for the synthesis of the silylated polyurethane is between 4 to 8 hours.

Catalysts typically used in the preparation of the above described urethane prepolymers as well as of the related silylated polyurethanes typically include organotin compounds and tertiary amines. Other suitable non-limiting examples of catalysts used for making polyurethane prepolymer are well known in the art and include chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine, and the like, with the various metals such as Al, Be, Mg, Zn, Cd, Pb, Ti, Zr, Sn, As, Bi, Cr, Mo, Mn, Fe, Co, Ni, and metal oxide ions as $MoO_2++$, $UO_2++$, and the like; alcoholates and phenolates of various metals such as $Ti(OR)_4$, $Sn(OR)_4$, $Sn(OR)_2$, $Al(OR)_3$, $Bi(OR)_3$ and the like, wherein R is alkyl or aryl of from 1 to about 18 carbon atoms, and reaction products of alcoholates of various metals with carboxylic acids, beta-diketones, and 2-(N,N-dialkylamino) alkanols, such as well known chelates of titanium obtained by this or equivalent procedures. Further catalysts include organometallic derivatives of tetravalent tin, trivalent and pentavalent As, Sb, and Bi, and metal carbonyls of iron and cobalt; and combinations thereof. In one specific embodiment organotin compounds that are dialkyltin salts of carboxylic acids, can include the non-limiting examples of dibutyltin diacetate, dibutyltin dilaurate, dibutyltin maleate, dilauryltin diacetate, dioctyltin diacetate, dibutyltin-bis(4-methylaminobenzoate), dibutyltindilaurylmercaptide, dibutyltin-bis(6-methylaminocaproate), and the like, and combinations thereof. Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like, and combinations thereof.

The silylated urethane resin may also contain an antioxidant stabilizer. A variety of phenols and hindered amines are suitable for stabilizing the STPU resin. Representative non-limiting examples of phenols suitable for stabilizing STPU include tetrakis[methylene(3,5-di-tert-butyl-4-hydroxyhydrocinnamate)]methane; octadecyl 3,5-di-tert-butyl-4-hydroxyhydrocinnamate; 3,5-di-tert-butyl-4-hydroxyhydrocinnamic acid, C7-9 branched alkyl esters; 1,3,5-trimethyl-2,4,6-tris(3,5-di-tert-butyl-4-hydroxybenzyl)benzene; 2,6-di-tert-butyl-4-(N,N'-dimethylaminomethyl)phenol; 2,6-di-tert-butyl-4-methylphenol; 2,2,6,6-tetramethyl-1-piperidinyloxy free radical; and 4-hydroxy-2,2,6,6-tetramethyl-1-piperidinyloxy free radical (4-hydroxy TEMPO).

Representative non-limiting examples of hindered amines suitable for stabilizing STPU include substituted aromatic amine; 2-(3,5-di-tert-butyl-2-hydroxyphenyl)-5-chlorobenzotriazole; dimethyl succinate polymer with 4-hydroxy-2,2,6,6-tetramethyl-1-piperidineethanol; poly(oxy-1,2-ethanediyl), (alpha-(3-(3-(2H-benzotriazol-2-yl)-5-(1,1-dimethylethyl)-4-hydroxyphenyl)-1-oxopropyl)-omega-hydroxy. These additives can be used either alone or in combination. These additives can be used at a level of about 100 ppm to about 2000 ppm of the total composition. Additionally, vitamin E maybe also be used as an antioxidant for stabilization of the finished STPU polymers.

In addition to the antioxidants the silylated urethane resin can contain quantities of dehydrating agent in order to maintain package stability. Various alkoxysilanes such as vinyltrimethoxysilane (Silquest A-171 from the General Electric Co.), or alkyltrialkoxysilanes such as methyltrimethoxysilane, ethyltrimethoxysilane and the like are effect for this application. They are typically incorporated at a level of about 0.5 to about 5.0 parts per 100 parts of silylated urethane polymer with about 0.5 to about 2.5 parts per 100 parts STPU polymer being more typical.

The synthesis is monitored using a standard titration technique (ASTM 2572-87) and infrared analysis. Silylation of the urethane prepolymers is considered complete when no residual NCO can be monitored by either technique.

STPU resins can be obtained from the direct reaction of the diol with an isocyanatosilane without initial formation of a polyurethane prepolymer. Clearly, one of the benefits of this synthetic approach is the formation of a STPU resin via a one-step process. The diols useful for this synthetic approach are the same as those described herein above and all other details of the chemistry for the production of STPU obtained from the direct reaction of diols with isocyanatosilane are the same as production from urethane prepolymers. The general chemistry and use of the STPU resins are discussed in U.S. Pat. No. 5,990,257 to Johnston et al. the entire contents of which are incorporated herein by reference.

In accordance with one embodiment of the present invention, one and two-part sealant, adhesive or coating formulations incorporating the above silyl-terminated polyurethane can be prepared by mixing together the silylated polyurethane and any of the customary functional additives known to those skilled in the art, such as one or more fillers, plasticizers, thixotropes, antioxidants, U.V. stabilizers, surfactants, defoamers, adhesion promoter(s) and/or cure catalyst. Satisfactory mixing is obtained using a double planetary mixer. In one-part sealant formulations, typically, the silylated urethane polymer, fillers, stabilizers and plasticizer are mixed at 80° C. for 60 to 90 minutes in vacuum. After cooling to 50° C., the desired silane adhesion promoter, dehydrating agent and cure catalyst are added and the mixture is stirred for an additional 30 minutes under a blanket of nitrogen. The preparation of a coating formulation can be done with a mixer incorporating a Cowles blade or similar high shear blade. Additionally, a dual asymmetric centrifugal mixer is useful for small quantities of formulations.

Commercial incorporation of the substrates of the present invention include various forms of construction, automotive applications, consumer applications, industrial application, window assembly, polyurethane foams, e.g., as used for the insulation for roofs, tanks and pipes, transportation applications, e.g., RV's, subway cars, trailers and the like.

The curable resin-forming composition adhered to the polymeric substrate of the present invention have utility as formable compositions to provide articles such as coated substrates, adhering substrates together and sealing joints between substrates having superior adhesion properties.

The functional additives of the one and two-part coatings, adhesives and sealant formulations of the present invention, include fillers, plasticizers, thixotropes, antioxidants, U.V. stabilizers, moisture scavengers, adhesion promoters, cure catalyst, surfactants, defoamers, color additives and biocides are known in the art.

Typical fillers suitable for formulation of the curable resin-forming composition of the present invention includes reinforcing fillers such as fumed silica, precipitated silica and calcium carbonates. In an embodiment of the present invention, treated calcium carbonates have particle sizes from about 0.07 micrometers (μm) to about 4 micrometers (μm) and are available from several companies under several trade names Ultra Pflex, Super Pflex, Hi Pflex from Specialty Minerals; Winnofil SPM, SPT from Zeneca Resins; Hubercarb 1Qt, Hubercarb 3Qt and Hubercarb W from Huber and Kotomite from ECC. Fillers commonly used in Japan include Hakuenka CCR, Hakuenka CC from Shiraishi Kogyo; Calfine 200 from Maruo Calcium. These fillers can be used either alone or in combination. To further improve the physical strength of the curable resin-forming composition, reinforcing carbon black can be used as a main filler, leading to black systems. Several commercial grades of carbon black useful in this invention are available, such as "Corax" products (Degussa). To obtain translucent formulations, higher levels of fumed silica or precipitated silica can be used as the main filler, without carbon black.

The fillers can be used either alone or in combination. The fillers can specifically comprise up to 200 parts per 100 parts of the silylated urethane polymer and more specifically from about 80 to 150 parts loading level for curable resin-forming composition, especially sealant formulations. For coating formulations the specific loading level of filler depends on the intended application characteristics. An elastomeric coating would have a reinforcing filler such as fumed silica present from about 5 to about 20 parts per 100 parts of the silylated urethane polymer.

The plasticizers customarily employed in the curable resin-forming sealant composition of the present invention can also be used in the invention to modify the properties and to facilitate use of higher filler levels. Exemplary plasticizers include phthalates, diproplyene and diethylene glycol dibenzoates and mixtures thereof; propylene glycol with weight average molecular weight ranging from about 200 grams per mole to about 5,000 grams per mole and more specifically from about 100 grams per mole to about 4,000 grams per mole available from Asahi Denka, Asahi Glass or Sankyo Chemical; epoxidized soybean oil and the like; and aliphatic diesters such as adipates and sebacates. Useful sources of dioctyl and diisodecylphthalate include those available under the trade names Jayflex DOP and JayFlex DIDP from Exxon Chemical. The dibenzoates are available as Benxoflex 9-88, Benzoflex 50 and Benzoflex 400 from Velsicol Chemical Corporation. The plasticizer comprises specifically up to about 200 parts per 100 parts of the silylated urethane polymer and more specifically from about 40 to about 150 parts per 100 part of silylated urethane polymer.

The curable resin-forming composition of the present invention can include various thixotropic or anti-sagging agents. Various castor waxes, fumed silica, treated clays and polyamides typify this class of additives. These additives comprise specifically from about 0.1 to about 10 parts per 100 parts silylated urethane polymer and more specifically from about 0.5 to about 6 parts per 100 parts silylated urethane polymer being preferred. Commercially available thixotropes include those available as: Aerosil from Degussa, Cabo-Sil TS 720 from Cabot, Castorwax from CasChem, Thixatrol and Thixcin from Rheox and Dislon from King Industries.

Stabilizers can be incorporated into the curable resin-forming composition of this invention specifically in an amount from about 0 to about 5 parts per hundred parts of silylated urethane polymer and more specifically from about 0.5 to about 2 parts. The stabilizers can include hindered amine and dialkydydroxyamine, such as bis 2,2,6,6-tetramethyl-4-piperidinely)sebacate (Tinuvin 770); dimethyl succinate polymer with 4-hydroxy-2,2,6,6,-tetramethyl-1-piperidineethanol (Tinuvin 622); alpha-(3-(3-(2H-benzotriazol-2-yl)-5-(1,1-dimethylethyl)-4-hydroxyphenyl)-1-oxopropyl)-omega-hydroxy (Tinuvin 213); and 2-(3,5-di-tert-butyl-2-hydroxyphenyl)-5-chlorobenzotriazole (Tinuvin 327). The stabilizers can also include primary antioxidants, such as 3,5-di-tert-butyl-4-hydroxyhydrocinnamic acid, C7-9 branched alkyl esters (Irganox 1135); octadecyl 3,5-di-tert-butyl-4-hydroxyhydrocinnamate (Irganox 1076); tetrakis [methylene(3,5-di-tert-butyl-4-hydroxy hydrocinnamate)] methane (Tinuvin 1010), and are available from Ciba-Geigy.

Various organofunctional silane adhesion promoters are useful in the curable resin-forming composition of the present invention, e.g., alkoxysilane adhesion promoters. Suitable alkoxysilane adhesion promoters include N-2-aminoethyl-3-aminopropyltrimethoxysilane, N-2-aminoethyl-3-aminopropyltriethoxysilane, 1,3,5-tris (trimethoxysilylpropyl) isocyanurate, gamma-aminopropyltriethoxysilane, gamma-aminopropyltrimethoxysilane, bis- gamma-trimethoxysilypropyl) amine, N- Phenyl-gamma-aminopropyl trimethoxysilane, triaminofunctional trimethoxysilane, gamma- aminopropylmethyldiethoxysilane, gamma- aminopropylmethyldiethoxysilane, gamma-methacryloxypropyltrimethoxysilane, gamma-methylaminopropyltrimethoxysilane, gamma-glycidoxypropylethyldimethoxysilane, gamma- glycidoxypropyltrimethoxysilane, gamma-glycidoxyethyltrimethoxysilane, beta-(3,4-epoxycyclohexyl)propyltrimethoxysilane, beta-(3,4-epoxycyclohexyl)ethyltrimethoxysilane, beta-(3,4-epoxycyclohexyl) ethyltriethoxysilane beta-(3,4-epoxycyclohexyl)ethylmethyldimethoxysilane, gamma-isocyanatopropyl triethoxysilane alpha-isocyanatopropylmethyldimethoxysilane, beta- cyanoethyltrimethoxysilane, gamma-acryloxypropyltrimethoxysilane, gamma-methacryloxypropylmethyldimethoxysilane, 4-amino-3,3,-dimethylbutyltrimethoxysilane, and N-ethyl-3-trimethoxysilyl-2-methylpropanamine and mixtures thereof. These materials are typically employed at levels of from about 0.5 to about 5 parts per hundred parts of the silylated urethane polymer, an more typically used from about 0.8 to about 2.0 parts per hundred parts of polymer. Suitable commercially available adhesion promoters would include but are not limited to various aminosilane such as Silquest® A-1120 silane, Silquest A-1110 silane, Silquest A-2120 silane, Silquest A-1170 silane; epoxysilanes such as Silquest A-187 silane; isocyanuratesilanes such as Silquest A-597 silane and mercaptosilanes such as Silquest A-599 silane and Silquest A-1891 silane, available from GE Advanced Materials, and combinations thereof.

Suitable cure catalysts are the same as those that have been previously described for preparation of the silylated urethane polymers. The catalysts typically comprise specifically from about 0.01 to about 3 parts per hundred parts of silylated urethane polymer, and more specifically from about 0.01 to about 1.0 parts per hundred parts of polymer. Timely curing (crosslinking) of the curable resin-forming composition can be achieved with the use of various metal complexes of tin, titanium, zirconium and the like. Dialkytin dicarboxylates, such as dibutyltin dilaurate and dibutyltin acetate, the stannous salts of carboxylic acids, such as stannous octoate and stannous acetate, and the like are most suitable. In an embodiment, the catalyst is dibutyltin dilaurate. The tin catalyst may be used alone or in combination with a tertiary amine such as lauryl amine.

The curable resin-forming composition of the present invention can include other additives typically employed for coating, adhesive and sealant applications. These additives would include solvents, pigments or other colorants, dyes, surfactant, fungicides and biocides. Such components may be employed in conventional amounts. Coating formulations would include additives as described for curable resin-forming composition, though in different proportions than sealant or adhesive formulations, and typically include solvents and defoamers as examples.

Some non-limiting examples of the surfactants that can be used with the curable resin-forming composition of the present invention are polyethylene glycol, polypropylene glycol, ethoxylated castor oil, oleic acid ethoxylate, alkylphenol ethoxylates, copolymers of ethylene oxide and propylene oxide, and copolymers of silicones and polyethers, copolymers of ethylene oxide, propylene oxide and mixtures thereof and the like.

The curable resin-forming composition of the invention can be provided as coatings, sealants and adhesives applied to a solid polymeric substrate by any common application methods know in the art, including rolling, spraying, extruding, brushing, and so forth. In some cases the curable resin-forming composition can be laminated onto the solid polymeric substrate or can be coated to form a film thereon. Such coating processes commonly use machines having an application section and a metering section. Careful control of the amount and thickness of the curable resin-forming composition obtains optimized layers without waste of material. A number of coating machines are known such as tension sensitive coaters, for example, coaters using a metering rod, brush coating methods, air knife coaters, etc. Such coating machines can be used to coat one or all sides of a polymeric substrate.

One or two-part sealant formulations incorporating STPU resins and typical additives, e.g., fillers, plasticizer, thixotropes, antioxidant, U. V. stabilizers, adhesion promoter(s), biocides and a cure catalyst can be prepared utilizing a batch or continuous process. A representative non-limiting general one-part STPU sealant formulation is presented in Table 1.

TABLE 1

| COMPONENTS | phr |
| --- | --- |
| STPU polymer | 100 |
| Plasticizer | 40 |
| Dehydrating agent | 1.5 |
| Calcium Carbonate small particle size | 60 |
| Calcium Carbonate large particle size | 40 |
| Light Stabilizer | 1-2 |
| Titanium Dioxide | 3 |
| Thixotrope | 6 |
| Adhesion Promoter | 1.5 |
| Tin Catalyst | 0.063 |

A one or two-part coating formulation can be prepared by batch or continuous process. A representative non-limiting general one-part STPU elastomeric coating formulation is presented in Table 2.

TABLE 2

| COMPONENTS | phr |
| --- | --- |
| STPU polymer | 100 |
| Dehydrating agent | 1.5 |
| Fumed silica | 15 |
| Light Stabilizer | 1-2 |
| Titanium Dioxide | 3 |
| Adhesion Promoter | 1.5 |
| Tin Catalyst | 0.3 |

Batch Process, as more fully described in U.S. Pat. No. 6,001,946 the entire contents of which are incorporated herein by reference, typically employs a standard double planetary or similar mixer. Typically, the STPU resin, fillers, stabilizers and plasticizer are mixed at 80° C. for 60 to 90 minutes. After cooling to 50° C., the desired silane adhesion promoter, dehydrating agent and cure catalyst are added and the mixture stirred for an additional 30 minutes.

Continuous Mode, as more fully described in U.S. Pat. No. 5,519,104 the entire contents of which are incorporated herein by reference, employs, for example, a 30 mm Werner-Pfliederer twin-screw extruder. A curable resin-forming composition incorporating the components outlined in Table 1 can be produced using the procedure described in U.S. Pat. No. 5,519,104. Typically, all sections of the extruder are heated to 75° C. The silylated polyurethane polymer and the calcium carbonate filler are metered into the extruder along with a blend of the plasticizer, organofunctional silane, adhesion promoter, antioxidants and light stabilizer. Into a side port of the extruder, the plasticizer and the tin catalyst are added. The STPU sealant is produced in the 30 mm Werner-Pfliederer twin-screw extruder at a rate of 40 lb/hr.

EXAMPLE 1 AND COMPARATIVE EXAMPLES 2 AND 3

Preparation of STPU Polymers: The materials for preparing STPU polymers of Example 1 and Comparative Examples 2 and 3 are presented in Table 3.

TABLE 3

| MATERIALS | Example 1 | Comparative Example 2 | Comparative Example 3 |
| --- | --- | --- | --- |
| polypropylene ether (Mw ~12000, Acclaim ® available from Bayer Material Science AG) | 400 g | | |
| polypropylene ether (Mw ~22000, PREMINOL ® 4022 available from Asahi Glass Co.) | | 400 g | |
| polypropylene ether (Mw ~16000, PREMINOL ® 4016 available from Asahi Glass Co.) | | | 400 g |
| isophorone diisocyanate (IPDI available from available from Bayer Material Science AG) | 3.7 g | — | — |
| gamma-isocyanatopropyltrimethoxysilane (available from General Electric Advanced Materials) | 7.5 g | 9.3 g | 12.9 g |

The silylated polyurethane (STPU) of Example 1 was prepared by Batch Process as described herein. Polypropylene ether (Acclaim® 12000) was agitated and sparged by nitrogen at 80° C. until the moisture content reduced to 200 ppm or less. Reactor temperature was cooled to 45±5° C. and isophorone diisocyanate (IPDI) was added to polypropylene ether polyol. 7 ppm of dibutyltin dilaurate catalyst SUL-4 (Fomrez® available General Electric Advanced Materials) was added 5 minutes later. The mixture was heated to 75° C. and maintained at 75±2° C. with continuous stirring, and under a nitrogen blanket to prevent the contamination of the silylated polyurethane with moisture. The isocyanate content (—NCO) was checked using the n-dibutylamine titration method and was monitored approximately every 1.5 hrs. After reaching the theoretical capping position, the gamma-isocyanatopropyltrimethoxysilane silane endcapper was added and the reaction proceeded at the same temperature until completion was determined by titration.

Comparative Examples 2 and 3 were prepared by the Batch Process as described herein above. High molecular weight and low monol content diol was directly endcapped with silane, as described herein below. Polypropylene ether (Preminol® 4022 for Comparative Example 2 and Preminol® 4016 for Comparative Example 3) was agitated and sparged by nitrogen at 80° C. until the moisture content reduced to 200 ppm or less. Reactor temperature was cooled to 45±5° C. and then gamma-isocyanatopropyltrimethoxysilane was added to the polypropylene ether of Comparative Examples 2 and 3, respectively. 7 ppm of SUL-4 catalyst was added 5 minutes later. The mixture was then heated to 75° C. and maintained at 75±2° C. with continuous stirring and under a nitrogen blanket. The reactions proceeded at the same temperature until completion was determined by titration.

The STPU polymers of Example 1 and Comparative Examples 2 and 3 were fully cured under controlled conditions for 2 weeks at 23° C. and 50% relative humidity (RH), prior to testing. The physical properties were evaluated by using standard ASTM test procedures. These included tensile strength, elongation, modulus (ASTM D 412,); tear resistance (ASTM D 624, Die C); Shore A hardness (ASTM C 661) and adhesion-in-peel (ASTM C 794). The results are displayed in Table 4.

TABLE 4

|  | Comparative Example 2 | Comparative Example 3 | Example 1 |
|---|---|---|---|
| Tensile Strength (psi) | 102.2 | 83.4 | 61.4 |
| Young's Modulus (psi) | 147.3 | 101.6 | 42.1 |
| Elongation (%) | 105.4 | 121.2 | 325.4 |
| Tear Resist. (Lb/in) | 14.1 | 9.6 | 14.2 |
| Tack-Free Time (min) | 6 | 10 | 15 |
| Hardness (SHORE A) | 32 | 24.5 | 9.5 |
| Viscosity (cP) | 34,800 | 15,300 | 53,000 |

Example 4 AND COMPARATIVE EXAMPLES 5 AND 6

The one-part STPU based sealant formulation of Example 4 and Comparative Examples 5 and 6 is presented in Table 5.

TABLE 5

| Components | Weight % |
|---|---|
| STPU Resin | 39.36 |
| Diisodecyl Phthalate (DIDP) Plasticizer | 15.74 |
| Vinyltrimethoxy silane (Moisture Scavenger/dehydrating agent) | 0.59 |
| Stearic acid treated calcium carbonate (Ultra-pflex) filler | 23.62 |
| Stearic acid treated Calcium cabonate (Hi-pflex) filler | 15.74 |
| Tinuvin 213 UV stabilizer | 0.39 |
| Tinuvin 622 LD UV stabilizer | 0.39 |
| $TiO_2$ UV stabilizer | 1.18 |
| $SiO_2$ Thixotropic agent | 2.36 |
| Dibutyltin dilaurate Catalyst (SUL-4) | 0.02 |
| N-(beta-aminoethyl)-gamma-aminopropyltrimethoxysilane (A-1120) adhesion promoter | 0.59 |
| Total | 100 |

One-part STPU based sealant formulations, Example 4 and Comparative Examples 5 and 6, were prepared in a known and conventional manner with the STPU resins described above using a one quart, double planetary Ross Power mixer equipped with a water-jacketed mixing kettle. Sealant Example 4 was prepared with the STPU resin of Example 1 and sealant Comparative Examples 5 and 6 were prepared with the STPU resins of Comparative Examples 2 and 3, respectively. When preparing Example 4 and Comparative Examples 5 and 6 the STPU resin, calcium carbonate fillers, titanium dioxide, thixotropic agent $SiO_2$, plasticizer and UV stabilizers were mixed at 30 rpm for 120 minutes at 80° C. under vacuum. After cooling to 50° C., the silane adhesion promoter, the silane-dehydrating agent (vinyltrimethoxysilane), and dibutyltin dilaurate catalyst were added, and the mixture was then stirred for an additional 30 minutes.

The STPU based sealant formulations (Example 4, Comparative examples 5 and 6) were drawn down to comparable thickness and the test specimens were fully cured under controlled conditions for 2 weeks at 23° C. and 50% relative humidity (RH), prior to testing.

The physical properties of the one-part STPU based sealant formulations of Example 4 and Comparative Examples 5 and 6 (as displayed in Table 6) were evaluated by using standard ASTM test procedures. These included tensile strength, elongation, modulus (ASTM D 412,); tear resistance (ASTM D 624, Die C); Shore A hardness (ASTM C 661) and adhesion-in-peel (ASTM C 794).

TABLE 6

| | One-part STPU based sealant formulations: | | |
|---|---|---|---|
| | COMPARATIVE EXAMPLE 5 | COMPARATIVE EXAMPLE 6 | EXAMPLE 4 |
| | Prepared with STPU resin of: | | |
| | Comparative Example 2 | Comparative Example 3 | Example 1 |
| Tensile (psi) | 205.3 | 232.2 | 222.1 |
| Young's Modulus (psi) | 189.7 | 230.2 | 87.4 |
| 100% Modulus | 129.6 | 144.3 | 80.2 |
| Elongation (%) | 199.8 | 210.9 | 623.4 |
| Tear Resistance (lb/in) | 36.5 | 34.6 | 52.3 |
| Shore A Hardness | 35.0 | 37.0 | 19.2 |

The peel strengths of the STPU based sealant formulations of Example 4 and Comparative Examples 5 and 6 on various substrates, e.g., aluminum, glass, PVC, polystyrene, nylon, ABS, were determined using standard ASTM C 794 test procedures. The results are displayed in Table 7

TABLE 7

| | Comparative Example 5 | | Comparative Example 6 | | Example 4 | |
|---|---|---|---|---|---|---|
| Substrates | Average Peel Strength (lbs/in) | Failure Type | Average Peel Strength (lbs/in) | Failure Type | Average Peel Strength (lbs/in) | Failure Type |
| Aluminum | 12.5 | 80% CF | 12.7 | 100% CF | 15.8 | 100% CF |
| Glass | 29.5 | 100% CF | 10.7 | 100% CF | 25.1 | 100% CF |
| PVC | 17.9 | 90% CF | 13.5 | 100% CF | 20.2 | 100% CF |
| Polystyrene | 11.1 | 100% AF | 9.3 | 100% AF | 19.2 | 50% CF |
| Nylon | 3.7 | 100% AF | 5.7 | 100% AF | 17.3 | 50% CF |
| ABS | 6.2 | 100% AF | 8.2 | 100% AF | 22.7 | 100% CF |

CF—cohesive failure;
AF—adhesive failure

The phrase "cohesive failure" as used herein is defined as that which occurs within the layer of STPU based sealant formulations. The phrase "adhesive failure" as used herein is defined as failure at the interface between the STPU based sealant formulations and one of the surfaces it contacts.

The STPU resins of Comparative Examples 2 and 3 that were obtained from direct silane endcapping of high molecular weight and low monol diols provided lower viscosity materials (16,500 and 20,500 cP, respectively) than the resin prepared in Example 1. When mixed with an appropriate catalyst and allowed to cure the resins obtained in Comparative Examples 2 and 3 had tack free times that were somewhat faster than that of Example 1. However, the physical properties of the cured resins of Comparative Examples 2 and 3 indicate they are significantly less flexible than the cured resin of Example 1 as demonstrated by their higher modulus, Shore A hardness and lower percent elongation performance (see Table 4). Moreover, Comparative Example 3 displayed a tear resistance that was significantly less than that of Example 1.

A similar trend in performance was observed when the resins of Example 1 and Comparative Examples 2 and 3 were formulated into STPU based sealant formulations of Example 4 and Comparative Examples 5 and 6, as displayed in Table 6. Sealants prepared with Comparative Examples 2 and 3 resin (STPU based sealant formulations of Comparative Examples 5 and 6, respectively) displayed tensile strengths comparable to that of the STPU based sealant of Example 4 that was prepared using STPU resin from Example 1. However, Comparative Example 5 and 6 displayed lower elongation and tear strengths while modulus and hardness are higher.

Significantly, the adhesion performance of sealant Comparative Examples 5 and 6 to polystyrene, nylon and ABS is significantly inferior to that of sealant Example 4 in both peel strength and degree of cohesion failure. Elastomeric coatings were prepared with STPU resin of the type described in Example 1, though from a separate synthesis run. Test samples were formulated as shown in Table 8. Comparative Example 10 represents the pure STPU resin control sample. Examples 7 through 9 were prepared with different types of fumed silica or with the addition of a plasticizer (Example 9). Hydrophobic fumed silica, Degussa Aerosil® R812, was used in Example 7 and hydrophilic fumed silica, Degussa Aerosil® 300, was used in Example 8. Examples 7 through 9 were thinned with 10 grams of n-butyl acetate per 100 g of formulation since the addition of fumed silica increased the viscosity relative to the pure resin. Coating samples were cured for 7 days at 23° C. and 50% relative humidity (RH), prior to testing.

TABLE 8

| | Elastomeric Coatings Formulations | | | |
|---|---|---|---|---|
| Components | Comparative Example 10 Weight % | Example 7 Weight % | Example 8 Weight % | Example 9 Weight % |
| STPU Resin | 100 | 90.1 | 90.1 | 82.6 |
| Diisodecyl Phthalate (DIDP) Plasticizer | 0 | 0 | 0 | 8.3 |
| Hydrophobic fumed silica (Aerosil ® R812) | 0 | 9.0 | 0 | 8.3 |
| Hydrophilic fumed silica (Aerosil ® 300) | 0 | 0 | 9.0 | 0 |

TABLE 8-continued

| | Elastomeric Coatings Formulations | | | |
|---|---|---|---|---|
| Components | Comparative Example 10 Weight % | Example 7 Weight % | Example 8 Weight % | Example 9 Weight % |
| Dibutyltin dilaurate Catalyst (SUL-4) | 0 | 0.30 | 0.30 | 0.28 |
| N-(beta-aminoethyl)-gamma-aminopropyl-trimethoxysilane (A-1120) adhesion promoter | 0 | 0.60 | 0.60 | 0.55 |
| Total | 100 | 100 | 100 | 100 |

Table 9 contains the physical properties data for the elastomeric coating examples. In both Examples 7 and 8 where a high surface area fumed silica is added, there is a dramatic increase in strength and tear resistance versus the pure resin (Comparative Example 10). A significant fraction of the elongation of the pure polymer is maintained when these types of silica are added.

TABLE 9

| | Elastomeric Coatings Formulations | | | |
|---|---|---|---|---|
| | Comparative Example 10 | Example 7 | Example 8 | Example 9 |
| Tensile (psi) | 75 | 314.3 | 296 | ND |
| Young's Modulus (psi) | 50 | 142.9 | 144 | ND |
| 100% Modulus | 32 | 109.2 | 117 | ND |
| Elongation (%) | 383 | 356.2 | 300 | ND |
| Tear Resistance (lb/in) | 13 | 46.4 | 44 | ND |
| Shore A Hardness | 13 | 22 | 35 | ND |

ND = not determined

Peel strength data for the elastomeric coatings Examples 7 though 9 are displayed in Table 10. These formulations exhibited relatively low adhesion to ABS except where 10 pph plasticizer was added (Example 9). Since the polymers have higher tensile strength and are stiffer than the sealant examples, the polymer/substrate bond failure tends to be adhesive rather than cohesive except in Example 9 where some cohesive failure was observed on ABS. For aluminum substrates, the formulation containing hydrophilic fumed silica had much higher peel strength and 100% cohesive failure versus 100% adhesive failure and lower peel strength when hydrophobic fumed silica was employed. The level of adhesion promoter was kept the same for the comparisons, but adjustment of the levels may improve the behavior of the latter system.

TABLE 10

| | Example 7 | | Example 8 | | Example 9 | |
|---|---|---|---|---|---|---|
| Substrates | Average Peel Strength (lbs/in) | Failure Type | Average Peel Strength (lbs/in) | Failure Type | Average Peel Strength (lbs/in) | Failure Type |
| Aluminum | 12 | 100% AF | 27 | 100% CF | 7.5 | 100% AF |

TABLE 10-continued

| Sub-strates | Example 7 | | Example 8 | | Example 9 | |
|---|---|---|---|---|---|---|
| | Average Peel Strength (lbs/in) | Failure Type | Average Peel Strength (lbs/in) | Failure Type | Average Peel Strength (lbs/in) | Failure Type |
| Nylon | ND | — | ND | — | 4.7 | 100% AF |
| ABS | 4.1 | 100% AF | 2.2 | 100% AF | 9.2 | 20% CF |

CF—cohesive failure;
AF—adhesive failure,
ND = not determined

While the process of the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

What is claimed is:

1. A solid polymeric substrate having adhered to at least a portion of a surface thereof a cured composition obtained from curing of a curable resin composition while in contact with said substrate, wherein said curable resin composition comprising:
    a) a curable silyl-terminated polyurethane polymer; and
    b) at least one additional component selected from the group consisting of filler, UV stabilizer, antioxidant, catalyst, adhesion promoter, cure accelerator, thixotropic agent, plasticizer, moisture scavenger, pigment, dye, surfactant, defoamer, solvent and biocide, and
    wherein the curable silyl-terminated polyurethane polymer is prepared by
    (i) the reaction of a stoichiometric excess of a polyether polyol with polyisocyanate to form a hydroxyl group-terminated polyurethane prepolymer; and
    (ii) endcapping the hydroxyl group-terminated polyurethane of step (i) with an isocyanatosilane.

2. The solid polymeric substrate having adhered to at least a portion of a surface thereof the cured composition of claim 1 wherein the polyether polyol is a polyether diol derived from ethylene oxide and/or propylene oxide and the polyisocyanate is a diisocyanate.

3. The solid polymeric substrate having adhered to at least a portion of a surface thereof the cured composition of claim 1 wherein polyether diol possesses a number average molecular weight of from about 2,000 to about 16,000 grams per mole.

4. The solid polymeric substrate having adhered to at least a portion of a surface thereof the cured composition of claim 1 wherein the polyether diol possesses a number average molecular weight of from about 8,000 to about 16,000 grams per mole.

5. The solid polymeric substrate having adhered to at least a portion of a surface thereof the cured composition of claim 1 wherein the diisocyanate is at least one member selected from the group consisting of aliphatic diisocyanate, cycloaliphatic diisocyanate, araliphatic diisocyanate and aromatic diisocyanate.

6. The solid polymeric substrate having adhered to at least a portion of a surface thereof the cured composition of claim 5 wherein the diisocyanate is at least one member selected from the group consisting of hexamethylene diisocyanate, para-phenylene diisocyanate, 4,4'-diphenylmethane diisocyanate, 2,4'-diphenyl-methanediisocyanate, isophorone diisocyanate, 4,4'-dicyclohexylmethane diisocyanate, 1,4-cyclohexane diisocyanate, 1,3-bis-(isocyanatomethyl)cyclohexane, 2,4-toluene diisocyanate, 2,6-toluene diisocyanate, naphathalene-1,5-diisocyanate, tetramethylxylyene diisocyanate and mixtures thereof.

7. The solid polymeric substrate having adhered to at least a portion of a surface thereof the cured composition of claim 1 wherein the stoichiometric excess of a polyether polyol with polyisocyanate is from about 1.05 to about 3.3 hydroxyl to isocyanate equivalent ratio and the hydroxyl group-terminated polyurethane prepolymer contains at least one hydroxyl functional group.

8. The solid polymeric substrate having adhered to at least a portion of a surface thereof the cured composition of claim 7 wherein the hydroxyl to isocyanate equivalent ratio is from about 1.2 to about 2.0 and the hydroxyl group-terminated polyurethane prepolymer contains at least one hydroxyl functional group.

9. The solid polymeric substrate having adhered to at least a portion of a surface thereof the cured composition of claim 1 wherein the isocyanatosilane possesses the general formula:

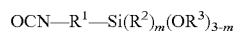

$$OCN-R^1-Si(R^2)_m(OR^3)_{3-m}$$

wherein $R^1$ is a divalent hydrocarbon group, to endcap the hydroxyl groups on said prepolymer with said isocyanatosilane, $R^2$ is alkyl group containing 1 to 4 carbon atoms, $R^3$ is alkyl group containing 1 to 4 carbon atoms and m is 0, 1 or 2.

10. The solid polymeric substrate having adhered to at least a portion of a surface thereof the cured composition of claim 9 wherein $R^1$ is an arylene, straight, cyclic or branched alkylene containing from 1 to about 12 carbon atoms.

11. The solid polymeric substrate having adhered to at least a portion of a surface thereof the cured composition of claim 9 wherein $R^1$ is a lower alkylene having 1 to 3 carbon atoms.

12. The solid polymeric substrate having adhered to at least a portion of a surface thereof the cured composition of claim 9 wherein $R^1$ has about 3 carbon atoms.

13. The solid polymeric substrate having adhered to at least a portion of a surface thereof the cured composition of claim 9 wherein said isocyanatosilane is at least one selected from the group consisting of gamma-isocyanatopropyltrimethoxysilane, gamma-isocyanatopropyl-triethoxysilaneisocyanatomethyldimethoxysilane, isocyanatomethyltrimethoxysilane, isocyanatopropyldimethylmethoxysilane, isocyanatopropyltrimethoxysilane, isocyanatoisopropyltrimethoxysilane, isocyanato-n-butyltrimethoxysilane, isocyanato-t-butyltrimethoxysilane, isocyanatopropyltriethoxysilane, isocyanatoisopropyltriethoxysilane, isocyanato-n-butyltriethoxysilane, and isocyanato-t-butyltriethoxysilane.

14. The solid polymeric substrate having adhered to at least a portion of a surface thereof the cured composition of claim 1 wherein the solid polymeric substrate is at least one selected from the group consisting of paper, cotton, fiberboard, paperboard, wood, woven or nonwoven fabrics, elastomers, polycarbonates phenol resins, epoxy resins, polyesters, polyethylencarbonate, synthetic and natural rubber, silicon, and silicone polymers.

15. The solid polymeric substrate having adhered to at least a portion of a surface thereof the cured composition of claim 14 wherein the solid polymeric substrate is at least one selected from the group consisting of polymethyl(meth)acrylate, polypropylenecarbonate, polybutenecarbonate, polystyrene, acrylonitrile-butadiene-styrene resin, acrylic resin, polyvinyl chloride, polyvinyl alcohol, polycarbonates, polyethylene terephthalate, polyurethanes and polyimides.

16. The solid polymeric substrate having adhered to at least a portion of a surface thereof the cured composition of claim 15 wherein the solid polymeric substrate is at least one selected from the group consisting of wood, polystyrene, nylon, and acrylonitrile-butadiene-styrene.

17. The solid polymeric substrate having adhered to at least a portion of a surface thereof the cured composition of claim 1 wherein the filler is at least one selected from the group consisting of fumed silica, precipitated silica, calcium carbonates, calcium, and carbon black, the antioxidant is at least one selected from the group consisting of tetrakis[methylene (3,5-di-tert-butyl-4-hydroxyhydrocinnamate)]methane, octadecyl 3,5-di-tert-butyl-4-hydroxyhydrocinnamate, 3,5-di-tert-butyl-4-hydroxyhydrocinnamic acid, 1,3,5-trimethyl-2,4,6-tris(3,5-di-tert-butyl-4-hydroxybenzyl)benzene, 2,6-di-tert-butyl-4-(N,N'-dimethylaminomethyl)phenol, 2,6-di-tert-butyl-4-methylphenol; 2,2,6,6-tetramethyl-1-piperidinyloxy, 4-hydroxy-2,2,6,6-tetramethyl-1-piperidinyloxy (4-hydroxy-TEMPO), 2-(3,5-di-tert-butyl-2-hydroxyphenyl)-5-chlorobenzotriazole; dimethyl succinate polymer with 4-hydroxy-2,2,6,6-tetramethyl-1-piperidineethanol; poly(oxy-1,2-ethanediyl), and (alpha-(3-(2H-benzotriazol-2-yl-5-(1,1-dimethylethyl)-4-hydroxyphenyl)-1-oxopropyl)-omega-hydroxy, the catalyst is at least one selected from the group consisting of dibutyltin dilaurate, dibutyltin acetate, tertiary amines, stannous octoate, and stannous acetate, the adhesion promoter is at least one selected from the group consisting of N-2-aminoethyl-3-aminopropyltrimethoxysilane, N-2-aminoethyl-3-aminopropyltriethoxysilane, 1,3,5-tris(trimethoxysilylpropyl)isocyanurate, gamma-aminopropyltriethoxysilane, gamma-aminopropyltrimethoxysilane, bis-gamma-trimethoxysilypropyl)amine, N-Phenyl-gamma-aminopropyltrimethoxysilane, triaminofunctionaltrimethoxysilane, gamma-aminopropylmethyldiethoxysilane, gamma-aminopropylmethyldiethoxysilane, gamma-methacryloxypropyltrimethoxysilane, gamma-methylaminopropyltrimethoxysilane, gamma-glycidoxypropylethyldimethoxysilane, gamma-glycidoxypropyltrimethoxysilane, gamma-glycidoxyethyltrimethoxysilane, beta-(3,4-epoxycyclohexyl)propyltrimethoxysilane, beta-(3,4-epoxycyclohexyl)ethyltrimethoxysilane, beta-(3,4-epoxycyclohexyl)ethyltriethoxysilane, beta-(3,4-epoxycyclohexyl)ethylmethyldimethoxysilane, gamma-isocyanatopropyltriethoxysilane, gamma-isocyanatopropylmethyldimethoxysilane, beta-cyanoethyltrimethoxysilane, gamma-acryloxypropyltrimethoxysilane, gamma-methacryloxypropylmethyldimethoxysilane, 4-amino-3,3,-dimethylbutyltrimethoxysilane, and N-ethyl-3-trimethoxysilyl-2-methylpropanamine, the thixotropic agent is at least one selected from the group consisting of castor waxes, fumed silica, treated clays and polyamides, the plasticizer is at least one selected from the group consisting of phthalates, diproplyene and diethylene glycol dibenzoates, the moisture scavenger is at least one selected from the group consisting of vinyltrimethoxysilane, methyltrimethoxysilane, and ethyltrimethoxysilane.

18. The solid polymeric substrate having adhered to at least a portion of a surface thereof the cured composition of claim 1 wherein the filler is present in an amount of from about 80 to about 200 parts per 100 parts of the curable resin composition, the UV stabilizer is present in an amount from about 0 to about 5 parts per 100 parts of the curable resin composition, the antioxidant is present in an amount from about 0 to about 5 parts per 100 parts of the curable resin composition, the adhesion promoter is present in an amount of from about 0.5 to about 5 parts per 100 parts of the curable resin composition, the cure accelerator is present in an amount from about 0 to about 3 parts per 100 parts of the curable resin composition, the thixotropic agent is present in an amount from about 0 to about 10 parts per 100 parts of the curable resin composition, the plasticizer is present in an amount of from about 40 to about 200 parts per 100 parts of the curable resin composition, the moisture scavenger is present in an amount from about 0 to about 5 parts per 100 parts of the curable resin composition, and the catalyst is present in an amount from about 0 to about 3 parts per 100 parts of the curable resin composition.

19. The solid polymeric substrate having adhered to at least a portion of a surface thereof the cured composition of claim 1 wherein the polyether polyol is polypropylene ether, the diisocyanate is isophorone diisocyanate and the isocyanatosilane is gamma-isocyanatopropyltrimethoxysilane.

20. The solid polymeric substrate having adhered to at least a portion of a surface thereof the cured composition of claim 19 wherein the solid polymeric substrate is at least one selected from the group consisting of polystyrene, nylon, and acrylonitrile-butadiene-styrene.

21. The solid polymeric substrate having adhered to at least a portion of a surface thereof the cured composition of claim 1 wherein the curable resin composition is provided as a sealant.

22. The solid polymeric substrate having adhered to at least a portion of a surface thereof the cured composition of claim 1 wherein the curable resin composition is provided as a coating.

23. The solid polymeric substrate having adhered to at least a portion of a surface thereof cured composition of claim 22 wherein the solid polymeric substrate is at least one selected from the group consisting of wood, polystyrene, nylon, acrylonitrile-butadiene-styrene and polyurethane foam.

24. The solid polymeric substrate having adhered to at least a portion of a surface thereof the cured composition of claim 1 wherein the curable resin composition is provided as an adhesive.

25. The solid polymeric substrate having adhered to at least a portion of a surface thereof the cured composition of claim 22 wherein the filler is present in an amount of from about 5 to about 100 parts per 100 parts of the curable resin composition.

26. The solid polymeric substrate having adhered to at least a portion of a surface thereof a the cured composition of claim 25 wherein the filler is fumed silica present at about 5 to about 20 parts per 100 parts of the curable resin composition.

* * * * *